United States Patent Office 3,546,286
Patented Dec. 8, 1970

---

3,546,286
OXIDATION OF POLYACROLEINS
Heinz Hartel and Ilse Ursula Nebel, Oberlar, Germany, assignors to Dynamit Aktiengesellschaft, Troisdorf, Germany, a corporation of Germany
No Drawing. Filed Oct. 11, 1965, Ser. No. 494,970
Claims priority, application Germany, Oct. 15, 1964, D 45,640
The portion of the term of the patent subsequent to June 4, 1985, has been disclaimed
Int. Cl. C07c 51/26
U.S. Cl. 260—530
7 Claims

ABSTRACT OF THE DISCLOSURE

An oxidation process wherein at least one of acrolein and methacrolein is polymerized in an aqueous medium in the presence of a redox polymerization catalyst following which the polymerization reaction product containing the polymerized monomeric material is brought into reactive contact with alkali and Cu(II)O or Cu(II)OH.

---

The present invention relates to a process for the oxidation of polyacrolein, polymethacrolein, and copolymers thereof.

In copending Ser. No. 472,737, filed July 16, 1965, now U.S. Pat. No. 3,387,029, there is disclosed a process for the oxidation of polyacrolein, polymethacrolein, and copolymers thereof by acting on any of the latter in an alkaline aqueous medium with an oxidant comprising a mixture of copper (II) oxide or copper (II) hydroxide and a noble metal, noble metal oxide or hydroxide. Preferably the oxidation reaction is carried out in the presence of a solvent for the polyacrolein as, for example, in the presence of pyridine.

Further in accordance with the process disclosed in said copending application, the process is affected in the presence of oxygen or a gas-containing oxygen whereby the catalyst used up in the oxidation is regenerated. The polyacroleins (by which term there is intended polyacrolein, polymethacrolein and their copolymers) are prepared by the usual redox polymerization of acrolein, methacrolein, etc., using therefor silver nitrate and potassium peroxy disulfate in an aqueous solution according to the method described by R. C. Schulz, H. Cherdron and W. Kern "Makromolekulare Chemie," 24, (1957), 141. The purification of the thusly formed polymer has heretofore been achieved by washing repeatedly and thereafter treating the washed polymer with sodium thiosulfate in order to completely remove any adherent silver nitrate, which, if allowed to remain, would result in a discoloration of the resulting polyaldehyde. This purification process and the drying process that follows consume a considerable amount of time and, furthermore, substantially increase the costs involved in the preparation of the polyaldehyde.

It is an object of the present invention to remedy the aforementioned difficulties of the prior art and the numerous additional defects which directly or indirectly result therefrom.

A further object is to oxidize polyacroleins by a process which is efficient and economical.

A still further object is to devise a process for producing oxidation products of polyacroleins which can be carried out continuously.

Another object of the invention is to devise a process for producing oxidation products of polyacroleins which can be carried without the necessity for the extensive purification treatment of the starting polymer.

Additional objects will become apparent from a consideration of the following description and claims:

In accordance with the invention it has now been found that the foregoing objects are accomplished by the oxidation of polyaldehydes and, in particular, of polyacrolein, polymethacrolein, and their copolymers effected by acting on the polymer in its mother liquor directly as it is obtained in the redox polymerization in the presence of alkali with a Cu(II) oxide or Cu(II) hydroxide. The further addition of a noble metal or noble metal oxide is not required and, further, the entire purification procedure of the polymer is eliminated.

In the redox polymerization of acrolein, the polymer is obtained in about an 80% yield. The yield of oxidation product according to copending application Ser. No. 472,737 amounts to 97%. Therefore, the overall yield of 77.6% of theory of oxidation product in the form of a polycarboxylic acid (with reference to the amount of acrolein charged) was to have been expected when carrying out the process of the invention. However, it has been established that, if the oxidation of the polyaldehyde to polycarboxylic acid is conducted directly following the redox polymerization of the acrolein without the further purification thereof, i.e., with the polyacrolein content in its mother liquor, the total yield obtainable with reference to the starting acrolein amounts to more than 80% of theory.

The redox polymerization and the oxidation can be carried out in a continuous process. The composition of the end product is identical with the conventionally obtained polycarboxylic acid, as can be established by infrared spectrum analysis.

The polycarboxylic acids prepared in accordance with the invention have chemical and physical properties similar to those of products prepared by polymerizing the corresponding monomeric unsaturated acids. The polycarboxylic acids thus produced can be used for the conventional applications in the conventional manner, i.e., as thickeners, sizing agents, protective colloids or finishing agents in the paper, leather or textile industries.

The procedure according to the invention can be carried out in the following manner: A redox polymerization of acrolein is conducted according to the method of R. C. Schulz, H. Cherdron and W. Kern (Makromolekulare Chemie, 24 (1957), 141, whereupon polyacrolein is obtained as a precipitate. Thereafter, NaOH or KOH and a saturated aqueous solution of a copper salt are added successively or simultaneously to thereby form CuO and Ag$_2$O. The CuO can also be prepared in advance and thereafter added. The mixture is then allowed to stand for a period of time at an elevated temperature as, for instance, 50° C., until the polymeric solid has dissolved in the form of its salt. After separation by suction filtering from the consumed oxide mixture, the oxidation yield can be obtained by titration and the polycarboxylic acid precipitated in conventional manner by the use of another stronger acid, such as, for instance, a mineral acid, and the thereby formed free acid isolated by filtration.

In a manner similar to that just described for polyacrolein, polymethacrolein or copolymers of acrolein and methacrolein can be produced from the corresponding monomers by redox polymerization and the polymers thus formed oxidized in a continuous process. At the same time oxygen or gas-containing oxygen can be additionally introduced.

The alkaline aqueous medium required for the reaction can be maintained by means of an alkali hydroxide, i.e., sodium hydroxide, potassium hydroxide, or their corresponding carbonates or bicarbonates as, for example, sodium carbonate, sodium bicarbonate, potassium carbonate, potassium bicarbonate, lithium carbonate, etc.

A particular advantage of the process of the invention lies in that the reaction takes place at temperatures between 0 and 100° C., and preferably between 50 and 100° C., and thus can be carried out in such manner that during the reaction the oxidizing agent which is used can be continuously regenerated with oxygen or oxygen-containing gases.

This invention is further illustrated by the following examples without being restricted thereto:

EXAMPLE 1

250 g. acrolein were converted into polyacrolein with 27.3 g. potassium peroxydisulfate and 17.1 g. silver nitrate in approximately 1500 cc. of water, in a manner similar to that described by Houben-Weyl in "Methoden der Organischen Chemie (Makromolekulare Stoffe)," p. 1084 (1961: 4th ed.). After complete precipitation of the polymer, 165 g. NaOH (in the form of an aqueous solution) and 140 g. $Cu(NO_3)_2 \cdot 3H_2O$ in a saturated aqueous solution were added successively with stirring. Thereafter oxygen in finely divided form was introduced into the mixture heated to about 50° C. As soon as the polymeric solid had gone into solution, the consumed oxide mixture was removed by suction filtering and the polycarboxylic acid was precipitated with hydrochloric acid. After washing and drying the yield amounted to 80.5% of theory, referred to the acrolein charged. The carboxyl group content of the polycarboxylic acid amounted to 69% of theory, referred to polyacrylic acid.

EXAMPLE 2

When molarly corresponding amounts of methacrolein were polymerized and oxidized by a procedure analogous to that disclosed in Example 1, a polycarboxylic acid was obtained after purification in a yield amounting to 71.6% of theory, referred to the methacrolein that was originally charged.

EXAMPLE 3

A copolymer of 90% acrolein and 10% methacrolein was prepared by a procedure analogous to that of Example 1. Thereafter, following the addition of 119 g. NaOH in aqueous solution and 46.1 g. of previously prepared CuO, the copolymer was heated to 100° C. and air was introduced. Following purification as carried out in Example 1, a polycarboxylic acid was obtained in a yield of 79.1% of theory with reference to the monomers that were originally charged.

We claim:

1. An oxidation process comprising polymerizing a member selected from the group consisting of acrolein, methacrolein, and mixtures thereof in an aqueous medium in the presence of silver nitrate and potassium peroxydisulfate and thereafter bringing into reactive contact the polymer formed in said reaction in its mother liquor directly as it is obtained in said polymerization, in the presence of alkali and oxygen with a member selected from the group consisting of Cu(II)O and Cu(II)OH and recovering the oxidized polymer.

2. Process according to claim 1, wherein said monomer group member is acrolein.

3. Process according to claim 1, wherein said monomer group member is methacrolein.

4. Process according to claim 1, wherein said monomer group member is a mixture of acrolein and methacrolein.

5. Process according to claim 1, wherein said redox catalyst is a mixture of silver nitrate and potassium peroxydisulfate.

6. A process according to claim 1, wherein said alkali is a member selected from the group consisting of alkali metal hydroxides, carbonates, and bicarbonates.

7. A process according to claim 1, which comprises introducing a member selected from the group consisting of oxygen and gases containing oxygen into said reaction medium during said oxidizing reaction, whereby the metal compounds used up in said reaction are regenerated to a higher oxidation stage.

References Cited

UNITED STATES PATENTS

| | | | |
|---|---|---|---|
| 3,387,029 | 6/1968 | Hartel et al. | 260—530 |
| 2,407,066 | 9/1946 | Dunlop | 260—345 |
| 2,228,566 | 6/1942 | Herstein | 260—530u |

OTHER REFERENCES

Houbon-Weyl, "Methoden der Organischem Chemie (Makromolekulare Stoffe)," pp. 1083–85, 4th ed., 1961.

JAMES A. PATTEN, Primary Examiner

D. E. STENZEL, Assistant Examiner